United States Patent

Bauck et al.

[11] Patent Number: 6,141,188
[45] Date of Patent: Oct. 31, 2000

[54] SECONDARY ACTUATOR

[75] Inventors: Randall C. Bauck, Boulder, Colo.; David E. Jones, Layton, Utah

[73] Assignee: Iomega Corporation, Roy, Utah

[21] Appl. No.: 09/137,852

[22] Filed: Aug. 21, 1998

[51] Int. Cl.[7] ................................................. G11B 5/55
[52] U.S. Cl. ...................................................... 360/245.4
[58] Field of Search ................................ 360/104–107, 360/244.2, 244.3, 244.7, 244.9, 245.2, 245.4, 246.7, 266.3

[56] References Cited

U.S. PATENT DOCUMENTS

| | | | |
|---|---|---|---|
| 4,188,645 | 2/1980 | Ragle et al. | 360/75 |
| 4,858,040 | 8/1989 | Hazebrouck | 360/78.05 |
| 5,189,578 | 2/1993 | Mori et al. | 360/106 |
| 5,438,469 | 8/1995 | Rudi | 360/109 |
| 5,521,778 | 5/1996 | Boutaghou et al. | 360/106 |
| 5,657,188 | 8/1997 | Jurgenson et al. | 360/106 |
| 5,793,571 | 8/1998 | Jurgenson et al. | 360/104 |

OTHER PUBLICATIONS

Miu, et al., "Silicon Micromachined Scaled Technology," 1993 JMSE International Conference on Advanced Mechanotronics, Tokyo, Japan, Aug. 1993, pp. 527–532.

Mori, et al., "A Dual Stage Magnetic Disk Drive Actuator Using A Piezoelectric Device For a High Track Density," IEEE Transactions on Magnetics, Nov. 1991, vol. 27, No. 6, pp. 5298–5300.

Miu, et al., "Silicon Microstructures and Microactuators for Compact Computer Disk Drives," IEEE Control Systems, Dec. 1994, pp. 52–57.

Miu, et al., "Silicon Microgimbals for Super–Compact Magnetic Recording Rigid Disk Drives," Adv. Info. Storage Syst., vol. 5, 1993, pp. 139–152.

*Primary Examiner*—Allen T. Cao
*Attorney, Agent, or Firm*—Woodcock Washburn Kurtz Mackiewicz & Norris LLP

[57] ABSTRACT

An actuator for a direct access storage device has a secondary actuator with discrete or distributed masses such that a mechanical nodal point is created. The nodal point does not move with respect to the primary actuator. The secondary actuator is attached to the primary actuator at a nodal point. No net forces are coupled to the primary actuator when the secondary actuator is activated in a vibratory movement by a piezo-electric element.

20 Claims, 4 Drawing Sheets

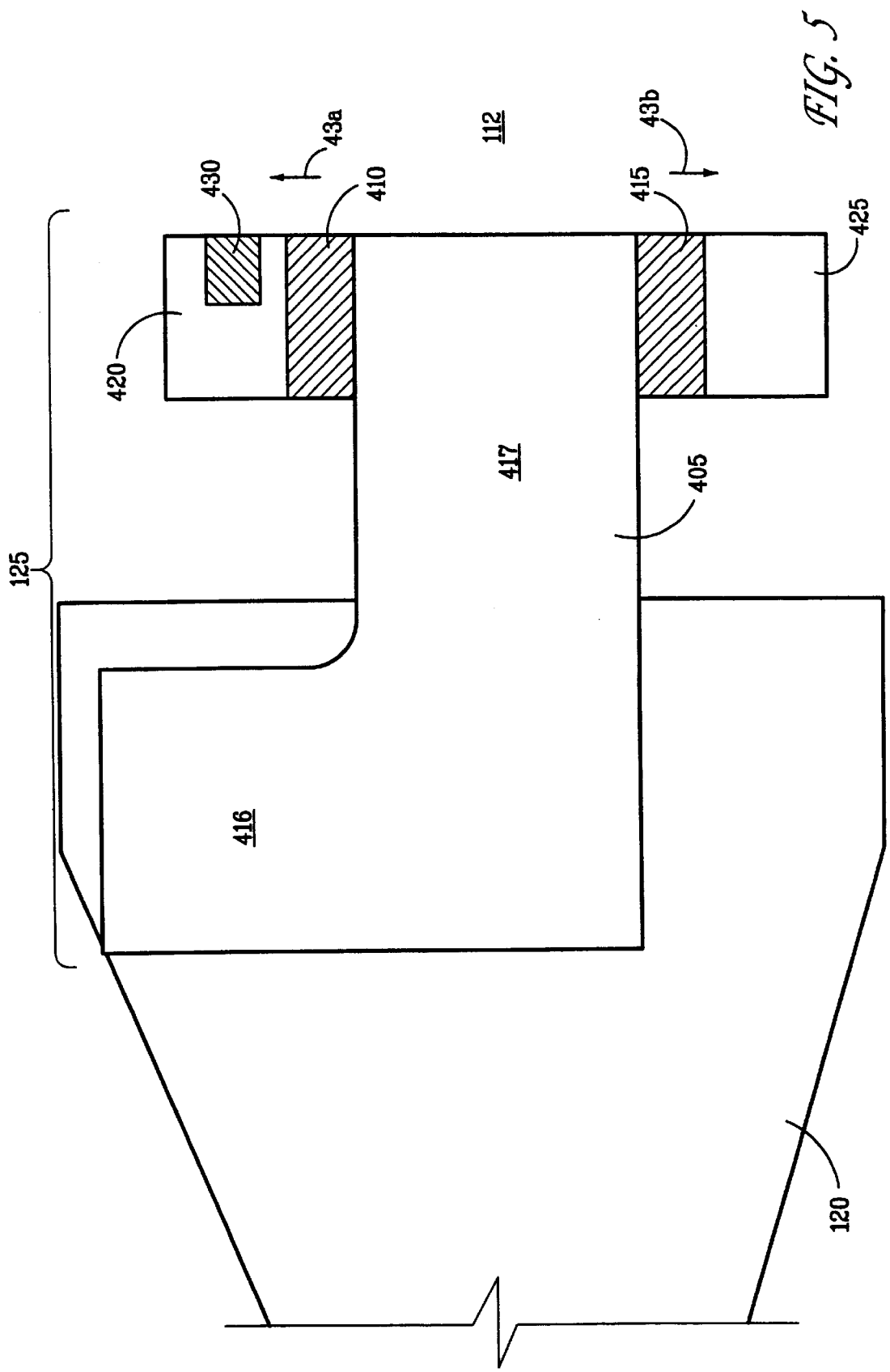

SECONDARY ACTUATOR

FIELD OF THE INVENTION

The present invention relates to a secondary actuator for use in a disk drive. More particularly, the invention relates to a secondary actuator, an actuator that moves relative to the primary actuator without imparting any significant mechanical force to the primary actuator.

BACKGROUND OF THE INVENTION

As the media for Direct Access Storage Devices (DASD) such as disk drives have realized higher track densities and decreasing track pitches, the actuators contained within the DASD have been similarly refined to accommodate the higher density recording. As the recording density has increased, the actuator capability for read/write resolution either has reached or is rapidly approaching its physical limit. The geometry and form factor of the disk drive limit the relative lever arm size, and further density increases are thereby limited unless alternative approaches are implemented.

The typical rotary actuator includes an arm, and a pivot therefore. Alternatively, linear actuators move the heads across the recording media in a linear movement. The actuator arm must be confined within the DASD and be movable with respect to the disk similarly located within the DASD. Any increase in the resonance frequency of the actuator arm which might serve to increase the track density of the DSAD device is severely limited by the physical size of the recording medium and the distance which must be covered by the actuator. Presently, the DASD disk surfaces and recordability are so improved as to permit an extremely high recording density.

Also, optical recording disks permit very high recording densities, allowing the extremely close placement of the recording tracks relative to each other on the disk of the DASD. With the disks having very fine resolution recording capability, the actuator and the actuator resonance frequency become the recording limiting factor. As track pitches decrease, there is a need for higher band width servo systems. Larger actuators typical of today's disc drives have resonances that are too low in frequency to allow adequate track following performance as track pitches decrease by a factor of 10 or more.

Maintaining the trend towards higher track densities and data rates in rotating memory devices require track following servo systems of increasing bandwidth for reliable storage and retrieval of data. The bandwidth requirements are even more severe in the emerging portable computing applications. Increase in the bandwidth is limited by the presence of mechanical resonance modes and nonlinearities in the voice coil motor (VCM) actuators. One approach to overcoming the problem is by using a dual or compound actuator. In such a mechanism, a VCM is used as a primary stage while the recording head is mounted on the secondary stage which in turn is mounted on the VCM. The secondary stage provides rapid small-motion and position correction to the recording head. Several dual-stage configurations have been proposed using electrostatic, piezoelectric and electro-magnetic secondary actuators. The concern with conventional secondary stage configuration however, is additional reaction forces generated by the motion of the secondary actuator that are felt by the primary stage, could excite resonances in the primary stage, virtually eliminating the desired bandwidth improvements of the dual stage configuration. The use of a secondary actuator, smaller and lighter in size, attached to a larger gross positioning actuator, allows higher band width servos to be used. Prior art devices such as CD ROMS use such a system. It is desirable that forces used to actuate the secondary servo, not excite or interfere with the primary or gross motion structure. Such forces could excite resonances in the primary structure.

A dual stage or compound actuator necessarily consists of two masses. The smaller mass will contain the device to be positioned. The larger mass is typically the main body of the primary or gross movement actuator. Forces are applied between the smaller mass and larger mass by electromagnetic, electrostatic or other means. It is through these forces that resonances in the larger mass can be excited. Often the primary mass is made many times greater than the smaller mass in order to reduce the effect of these forces on the larger mass.

It is an object of the present invention to provide a secondary actuator design that eliminates the coupled forces between the secondary and the primary of a compound actuator design.

SUMMARY OF THE INVENTION

The foregoing and other objects, features and advantages of the invention will become evident hereinafter. According to the present invention, the secondary actuator has discrete or distributed masses such that a mechanical nodal point is created. A mechanical nodal point is a location on a body that does not move with respect to a fixed frame of reference during some event. The secondary actuator is then attached to the primary actuator at this nodal point. The net result is that no forces are coupled into the primary actuator when the secondary actuator is activated.

In another embodiment the forces on the secondary actuator are inertially offset. As the secondary actuator is activated, an appropriate opposing force is created within the secondary actuator structure such that all forces are canceled within the secondary actuator, and no forces are transmitted through the attachment point.

More particularly, an actuator comprises an actuator motor, such as one with a voice coil and a magnet, an actuator arm, and a secondary actuator assembly. A primary actuator positions an actuator arm over the tracks of the recordable media to effect the retrieval and storage of data. The secondary actuator assembly is mechanically coupled to the actuator arm at a point on a nodal line and contains a read/write head to be positioned for the retrieval and storage of data on a readable/recordable media. The secondary actuator assembly is mechanically coupled to the primary actuator such that the secondary actuator moves relative to the position of the primary actuator to effect read/write functions, but this vibration does not impart reaction forces to the primary actuator.

The secondary actuator assembly comprises a three dimensional geometric shape having a discrete or distributed mass creating a nodal line. The creation and position of the mechanical nodal line directly relates to the mass distribution. According to the present invention the secondary actuator contains protrusions located to provide the distributed mass that creates the nodal line.

In the present invention, a transducer such as a piezoelectric element is contained in the secondary actuator assembly activating the movement of the secondary actuator. When the secondary actuator vibrates, the mechanical nodal line does not move in respect to the primary actuator resulting in zero net force transmitted from the primary to the secondary actuator.

Alternatively, the secondary actuator design according to the present invention, can substantially actuator through the inertial displacement of discrete masses in a direction opposite to the direction of the vibrational forces. The discrete masses are located in the secondary actuator assembly in relation to the direction of movement of the secondary actuator such that when the secondary actuator assembly is driven in one direction the masses are driven in the opposite direction resulting in a substantially zero net-force.

BRIEF DESCRIPTION OF THE DRAWINGS

The forgoing summary, as well as the following detailed description of the preferred embodiments, is better understood when read in conjunction with the appended drawings. For the purpose of illustrating the invention, there is shown in the drawings embodiments that are presently preferred, in which like references numerals represent similar parts throughout the several views of the drawings, it being understood, however, that the invention is not limited to the specific methods and instrumentalities disclosed.

The invention will now be further described by way of example, with reference to the appended drawings, in which:

FIG. 5 is a plan view of an alternative embodiment of the invention;

DETAILED DESCRIPTION OF THE PREFERRED EMBODIMENT

A secondary actuator with the above-mentioned beneficial features in accordance with exemplary embodiments of the invention will be described below with reference to FIGS. 1–5. It will be appreciated by those of ordinary skill in the art that the description given herein with respect to those figures is for exemplary purposes only and is not intended in any way to limit the scope of the invention. For example, the present invention is described throughout the specification with reference to a rotary actuator; however the invention could be used in a linear actuator or other actuator like components wherein the suppression of additional vibrational forces is desirable. All questions regarding the scope of the invention may be resolved by referring to the appended claims.

Figure 1:
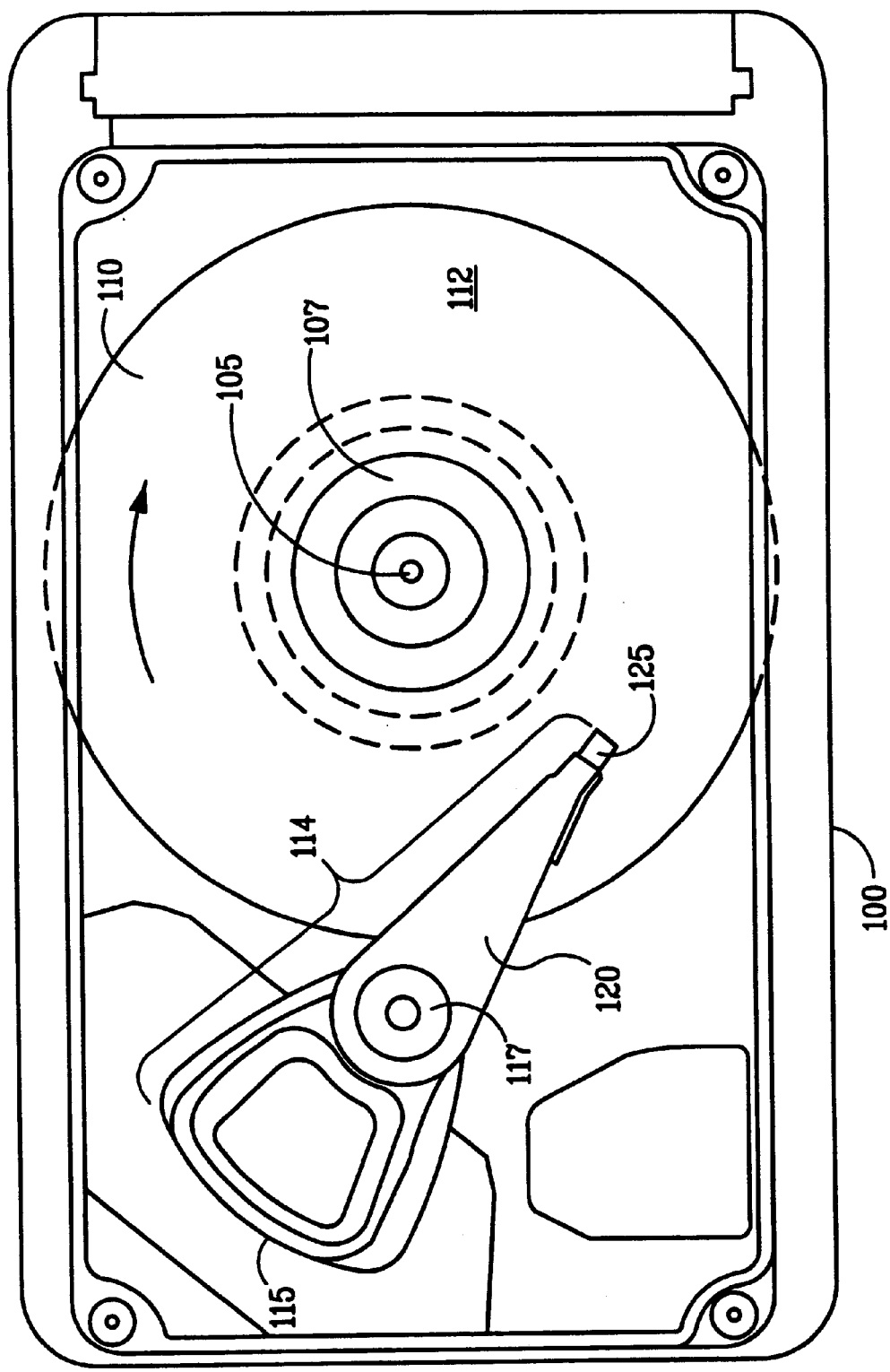
FIG. 1 illustrates a DASD incorporating an embodiment of the present invention.

FIG. 1 shows a DASD 100 incorporating the subject invention has a rotatable magnetic disk 110 supported therein. The disk has a recording media 112 and is rotationally driven by disk drive motor 105. Data is recorded in circular tracks on the recording media. The disk 110 is supported by a disk spindle bearing 107. Recording surface 112 is accessed across its radial dimension by actuator 114. Actuator 114 is comprised of a voice coil assembly 115, an actuator arm 120, referred to as a primary positioning actuator, pivoted on actuator pivot 117 and a secondary actuator assembly 125. Secondary actuator assembly 125 extends from the distal end of the primary actuator 120. Read/write heads 300 (Shown in FIG. 3), vibrate along the direction of movement of primary actuator 120. Read/write heads 300 interact with the recording surface 112 in a read or write operation.

Figure 2:
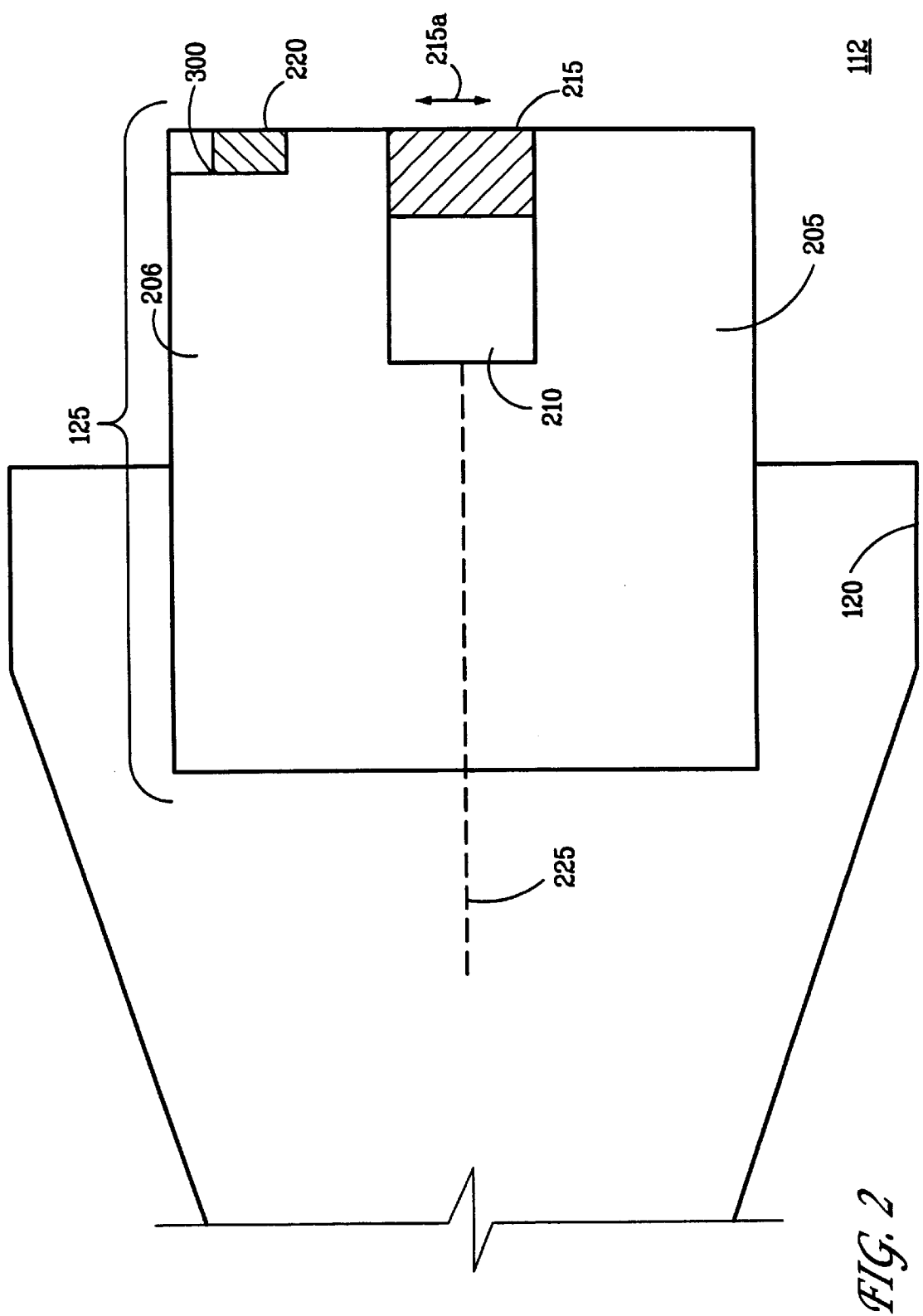
FIG. 2 is a plan view of the presently preferred embodiment of the invention.
Figure 3:
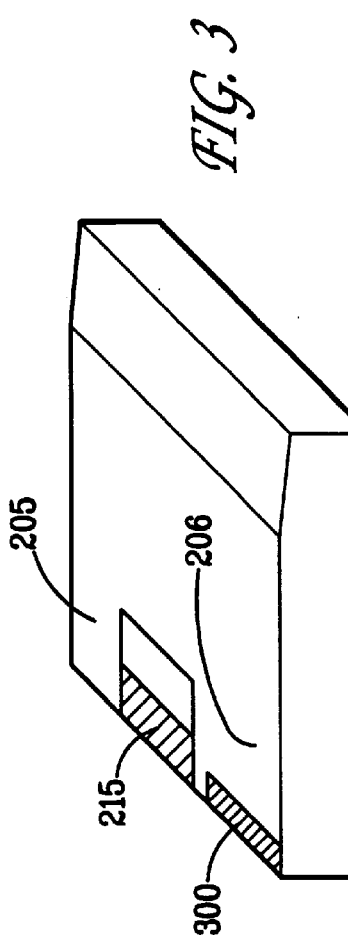
FIG. 3 is a perspective view of the secondary actuator of FIG. 2, showing the presently preferred embodiment of the invention.

For a more detailed discussion of the secondary actuator 125, reference is now made to FIGS. 2 and 3. FIG. 2 shows the top view of a preferred embodiment of the secondary actuator 125. The secondary actuator 125 is mechanically coupled to the primary actuator 120 at a point along nodal line 225. As shown, the secondary actuator 125 has a geometric shape having an opening 210 and mass protrusions 205 and 206. A read/write head 300 is contained in a slot in protrusion 206. MIG and thin film heads are suitable for use. A piezo-electric element 215 is attached in the opening 210 to drive the secondary actuator 125 into vibratory motion in the direction of arrows 215a.

Alternatively, electrostatic or electromagnetic transducers can be used. When in motion the read/write head 300 (Shown in FIG. 3) interacts with recording surface 112 to store and retrieve data. In operation, nodal line 225 does not move in relation to primary actuator 120 providing substantially zero net additional vibrational force to primary actuator 120.

Nodal line 225 is formed along the center line through the geometric center of the secondary actuator 125. During vibration of the secondary actuator assembly, a multiple of vibrational forces are created on the protrusion 206. These forces are substantially canceled at the nodal line by forces created by the movement of the second 25 protrusion 205.

Figure 4:
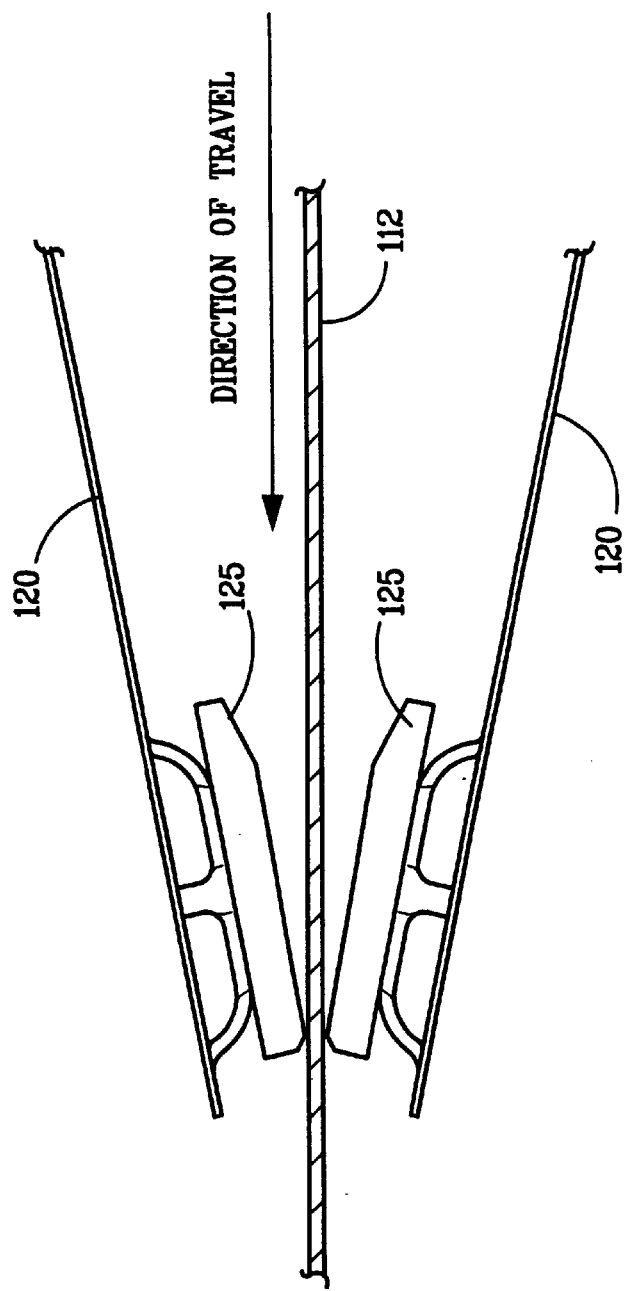
FIG. 4 shows two assemblies engaging a recording disk.

FIG. 4 illustrates the position of secondary actuator assembly during DASD operation. As shown in FIG. 4, secondary actuator 125 is mechanically coupled to the distal end of primary positioning actuator 120, such that read write heads 300 (Shown in FIG. 3) are proximate to recording surface 112 to facilitate read/write operations.

FIG. 5 shows an alternative embodiment of the invention in which multiple transducers are positioned so that vibrational forces cancel in this embodiment, the secondary actuator assembly 125 comprises a large L-shaped, fixed body mass 405 mechanically coupled to primary actuator 120. Other shapes may be used or the transducers may be attached directly to the primary actuator 120.

The secondary actuator assembly has a solid L-like shape with a base 416 and a protrusion 417, having a top surface, a bottom surface, a front surface and side surfaces. The protrusion 417 is connected to base 416 which is connected to primary actuator 120. The front surface and the side surfaces form three dimensional geometric protrusions perpendicular to the top surface substantially near the front end.

Transducer elements 410 and 415 which are attached to the front end of large fixed body mass 405 to drive the secondary actuator assembly 125, when excited. Discrete masses 420 and 425 are attached to the piezo-electric transducer elements 410 and 415 respectively, providing counter-balancing forces in opposite and offsetting directions of movement. The counterbalancing forces are denoted by the arrows 431 and 432. Discrete mass 420 in addition contains the read/write head assembly 430 (Shown in FIG. 5) that interact with recordable surface 112.

During the actuation of the secondary actuator assembly 125, the secondary actuator creates reaction forces on a first of the mass elements 420. Force 431 is substantially canceled because of additional force 432 created by the movement of a second mass element 425 relative to the first mass element 420.

The foregoing examples have been provided for the purpose of explanation and are in no way to be construed as limiting of the present invention. While the invention has been described with reference to preferred embodiments, it is understood that the words which have been used herein are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. An actuator for use in a direct access storage device including a recording medium, comprising:
 a primary positioning actuator having an actuator arm moveable by said motor, said actuator arm having a distal end moveable across said recording medium;
 a secondary actuator assembly mechanically coupled proximate to said distal end of said actuator arm;
 a read/write head mechanically coupled to said secondary actuator; and
 a transducer on said secondary actuator, said transducer imparting a vibratory motion to said secondary actuator in the direction of movement across said tracks,
 said secondary actuator having a nodal point at which minimal vibratory movement occurs, said secondary actuator being coupled to said actuator arm at said nodal point.

2. The actuator recited in claim 1, wherein said secondary actuator has three-dimensional protrusions with a slot there between, said transducer element being located in said slot.

3. The actuator recited in claim 2, wherein said protrusions have masses such that a mechanical nodal line extends from a point between said protrusions along said secondary actuator, said secondary actuator being attached to said actuator arm at a point along said nodal line so no forces are coupled to said actuator arm when said transducer element is energized.

4. The actuator recited in claim 1, wherein said primary positioning actuator positions said actuator arm in a course positioning mode and said secondary actuator assembly vibrates relative to said actuator arm by controlled electrical energizing of said transducer element.

5. The actuator recited in claim 3, wherein a nodal line is formed along the center line through the geometric center of said secondary actuator, such that during vibration of said secondary actuator assembly, said secondary actuator creates a multiple of vibrational forces on a first of said protrusions, said forces being substantially canceled at said nodal line by additional forces created by the movement of a second protrusion relative to said first protrusion.

6. The actuator recited in claim 5 wherein said secondary actuator assembly is attached to said actuator arm along said nodal line.

7. The actuator recited in claim 1, wherein said actuator is a rotary actuator.

8. The actuator recited in claim 1, wherein said secondary actuator assembly forms two protrusions.

9. The actuator recited in claim 8, wherein said protrusions have different sizes.

10. The actuator recited in claim 1 wherein said transducer is a piezo-electric transducer.

11. The actuator recited in claim 1 wherein said transducer is an electromagnetic transducer.

12. The actuator recited in claim 1 wherein said transducer is a electrostatic transducer.

13. An actuator for use in a direct access storage device including a storage medium comprising;
 a primary positioning actuator motor;
 a primary actuator arm moveable by said motor, said primary actuator arm having a distal end moveable across said record medium and a nodal line at which minimum vibration occurs;
 a read write assembly mechanically coupled to said primary actuator along said nodal line; and
 first and second transducers coupled to said primary actuator, said transducers imparting a vibratory force to said read/write assembly, said vibratory forces being substantially canceled in said primary actuator.

14. The actuator recited in claim 13 wherein said read/write assembly further comprises:
 a secondary actuator, said secondary actuator assembly having a mass, said transducers being attached to said mass to impart vibratory forces to said mass which cancel each other.

15. The actuator recited in claim 14 further comprising:
 first and second mass elements attached to said first and second transducers respectively,
 said first mass element having a slot housing read/write heads, said transducers being attached to said mass elements, the second of said mass element creating a vibratory force, when said transducers are excited, that substantially cancels the force created by the movement of said first mass element.

16. The actuator recited in claim 15 wherein said first and second mass elements have different weights and sizes.

17. The actuator recited in claim 13 wherein said transducers are piezo-electric devices.

18. The actuator recited in claim 13 wherein said transducers are electromagnetic devices.

19. The actuator recited in claim 13 wherein said transducers are electrostatic devices.

20. The actuator recited in claim 14 wherein secondary actuator assembly has a solid three dimensional L-like shape with a base portion and a protuberance extending from said base forming a three dimensional geometric protrusion perpendicular to said base;
 each of said transducers being attached to a side surface of said protrusion.

* * * * *